United States Patent [19]
Lanz

[11] Patent Number: 5,611,597
[45] Date of Patent: Mar. 18, 1997

[54] CHILD SAFETY SECURING APPARATUS AND METHOD

[76] Inventor: Brett E. Lanz, 9705 Kenora La., Spring Valley, Calif. 91977

[21] Appl. No.: 301,557

[22] Filed: Sep. 6, 1994

[51] Int. Cl.⁶ .................................................. A47D 1/10
[52] U.S. Cl. ........................ 297/256.17; 297/217.1; 297/485; 297/250.1; 297/DIG. 6
[58] Field of Search ........................... 297/485, 464, 297/471, 250.1, 256.17, 266, 488, 217.1, 217.7, DIG. 6; 182/3; 280/33.992, 33.993, 801.1

[56] References Cited

U.S. PATENT DOCUMENTS

| | | | |
|---|---|---|---|
| 2,162,948 | 6/1939 | Gosselin | 182/3 X |
| 2,625,987 | 1/1953 | Hunter | 297/250.1 X |
| 2,865,433 | 12/1958 | Warner | 297/250.1 X |
| 3,042,032 | 7/1962 | Vogel | 297/466 X |
| 3,351,380 | 11/1967 | Sprague | 297/256.17 X |
| 4,108,489 | 8/1978 | Salzman | 297/256.17 X |
| 4,204,695 | 5/1980 | Salzman | 297/256.17 X |
| 4,324,430 | 4/1982 | Dimas, Jr. et al. | 297/256.17 |
| 4,521,052 | 6/1985 | Cone | 297/250.1 X |
| 4,619,468 | 10/1986 | Spill | 297/488 |
| 4,637,622 | 1/1987 | Burgard | 280/33.993 |
| 5,056,865 | 10/1991 | Sedlack | 297/256.17 |
| 5,118,163 | 6/1992 | Brittian et al. | 297/250.1 |
| 5,203,613 | 4/1993 | Ward | 297/485 |
| 5,263,726 | 11/1993 | Wood | 280/33.993 X |
| 5,330,250 | 7/1994 | Reyes | 297/256.17 X |
| 5,385,387 | 1/1995 | Kain | 297/256.17 X |
| 5,439,253 | 8/1995 | Trubiano | 280/33.993 X |

Primary Examiner—Milton Nelson, Jr.
Attorney, Agent, or Firm—Brown, Martin, Haller & McClain

[57] ABSTRACT

A child seat securing apparatus for securing the child seat to an object, such as a shopping cart or household chair. The apparatus comprises a strap having a fastener on each end for attaching the strap to the object. The child seat is placed on the object, and the fasteners are attached to the object such that the strap crosses over the child seat, thereby securing the child seat to the object. The apparatus may alternatively comprise a child seat having at least two straps affixed to it, whereby the straps have fasteners on their free ends that attach to the object and secure the child seat to the object.

14 Claims, 2 Drawing Sheets

CHILD SAFETY SECURING APPARATUS AND METHOD

BACKGROUND OF THE INVENTION

1. Field of the Invention

The present invention relates to child safety. More particularly, the present invention relates to a system for strapping a child seated in a baby seat to an object, such as a shopping cart, so that the seat and child are safely secured to the object.

2. Description of Related Art

Children, particularly infants, are frequently placed within child safety seats and carried to various places in the seat. For example, many parents take their children to stores, such as grocery stores, when the parents are shopping, and the parents carry the children in the safety seat. When they reach the store, they place the child and seat in a shopping cart and push the cart around the store.

Present child safety seats, however, do not have a universally applicable apparatus by which to secure the safety seat to a shopping cart. Moreover, no such securing apparatus exists that can be quickly and easily used to secure children and their seats to other objects, such as household chairs. The result is a risk that the child and seat will be dislodged from the shopping cart or household chair with disastrous consequences.

This risk is particularly acute in shopping carts. Shopping carts are moved around the store and may be bumped or struck by other carts or objects in the cart's path. Further, many parents, who have an infant and an older child, will place the older child within the basket of the cart and the safety chair over the cart handle, creating a risk that the older child will dislodge the safety chair with the infant in it.

Therefore, a need exists for a securing apparatus that is quick and simple to use and that is universally applicable to any shopping cart or other object in which parents place children within a safety seat.

SUMMARY OF THE INVENTION

Accordingly, the present invention is directed to a child safety seat securing apparatus that substantially obviates one or more of the problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the apparatus particularly pointed out in the written description and claims of this application, as well as the appended drawings.

To achieve these and other advantages, and in accordance with the purpose of the invention as embodied and broadly described herein, the present invention is a child seat securing apparatus for securing a child seat to an object. The securing apparatus comprises a strap having a first end and a second end, as well as a first attaching means, affixed to the first end, for attaching to the object and a second attaching means, affixed to the second end, for attaching to the object. When the child seat is placed on the object, the first securing means and the second securing means are attached to the object such that the strap crosses over the child seat thereby securing the child seat to the object. In accordance with the present invention, the object is not an automobile seat.

In another aspect, the present invention is a child seat securing system. The system comprises a child seat having a first attaching area and a second attaching area. The system further includes a first strap having a first end and a second end, in which the first end is attached to the first attaching area, and the second end has a first securing means for securing the first strap to a first point on an object. In addition, the system comprises a second strap having a first end and a second end, the first end being attached to the second attaching area, and the second end having a second securing means for securing the second strap to a second point on the object. Again, the object is not an automobile seat.

In yet another aspect, the present invention is a system for securing a child seat. The system comprises a shopping cart having a first side and a second side opposing the first side. The system also comprises a strap having an attaching means for attaching the strap to the shopping cart. When the child seat is placed on the shopping cart, the strap is attached to the shopping cart by the attaching means such that the strap engages the child seat thereby securing the child seat to the shopping cart.

in still another aspect, the present invention is a method for securing a child seat to an object. The method comprises the steps of: placing the child seat on the object; attaching a first end of a strap to the object; crossing the strap over the child seat; and attaching a second end of the strap to the object, thereby securing the child seat to the object. The object is not an automobile seat.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to explain the principles of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a child safety securing apparatus is provided for securing a child seat to an object, such as a shopping cart or household chair. The child safety securing apparatus includes a strap having fastener ends that can be used to secure the child seat to a shopping cart and thereby prevent the child seat from being dislodged from the shopping cart.

Figure 1:
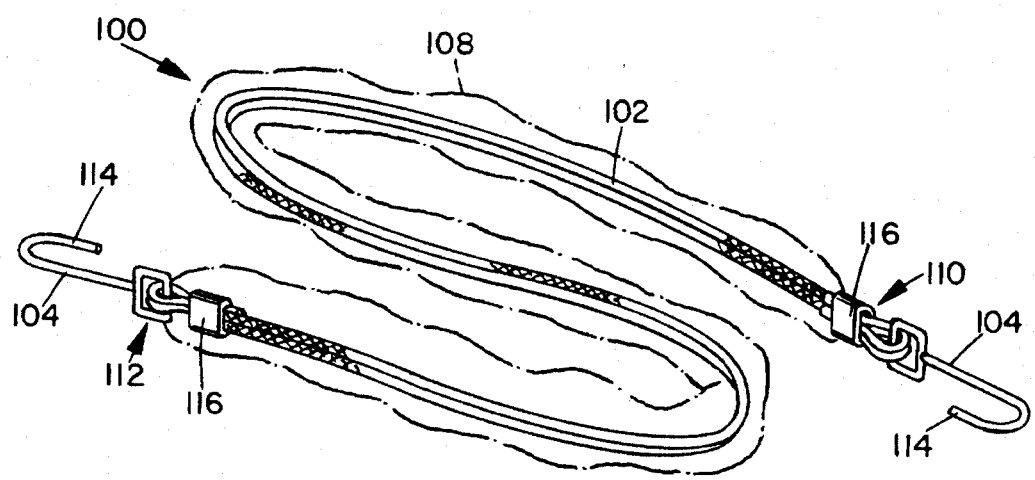
FIG. 1 is a pictorial view showing a typical child seat secured on the handle of a shopping cart.

An exemplary embodiment of the child seat securing apparatus of the present invention is shown in FIG. 1 and is designated generally by reference numeral 100. The child seat securing apparatus includes a strap 102. On each end of the strap 102, fasteners 104 are provided, which can be attached to an object in or on which the child seat is placed. The strap may also have an external sheath 108.

The strap 102 is preferably an elastic material, allowing a certain amount of stretch for the apparatus 100. For example, the strap 102 can be formed from the same or similar material as are "bungy" cords, giving the strap 102 sufficient stretch, as well as sufficient strength and securing power. Alternatively, the strap 102 may be non-elastic, e.g., a piece of nylon webbing used in various applications for securing objects.

The fasteners 104 are provided on either or both ends 110, 112 of the strap 102. As those skilled in the art will recognize, the fasteners 104 may be attached to the strap 102 in a variety of ways. For example, as illustrated in FIG. 1, the strap 102 may be doubled over on itself with a clamping mechanism 116 being compressed over the ends of the strap 102 to secure it to the fastener 104. The strap 102 may alternatively be sewn or stitched to the fasteners 104, or be glued or otherwise secured.

Preferably, the fasteners 104 comprise a hook 114, as illustrated in FIG. 1. The hook 114 can be open-ended and thus non-locking. In this embodiment, the hook 114 is merely attached to a point or area on the object in which the child seat is placed and can be removed easily and quickly.

Figure 5:
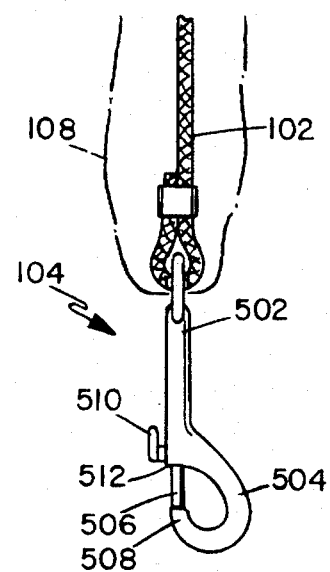
FIG. 5 is an enlarged view of an alternative locking snap hook on the restraining strap.

With reference to FIG. 5, the fasteners 104 may alternatively have a locking hook that prevents unwanted detachment of the fasteners 104 from the object to which the apparatus 100 is affixed, providing an additional measure of safety. The fastener of FIG. 5 includes a stem 502 and a hook portion 504. A locking post 506 extends from within the stem 502 to the tip 508 of the hook portion 504. The locking post 506 is spring loaded, the spring (not shown) being encased within the stem 502. The locking post 506 has a button 510 that is used to move the locking post 506 in a direction away from the tip 508 of the hook portion 504 into the stem 502. Thus, by moving the button 510 upward, the locking post 506 retracts within the stem 502, thereby leaving an opening in the hook portion 504 from the tip 508 to the end 512 of the stem 502. With the hook portion 504 open, the fastener 104 can be secured to an object.

Figure 6:
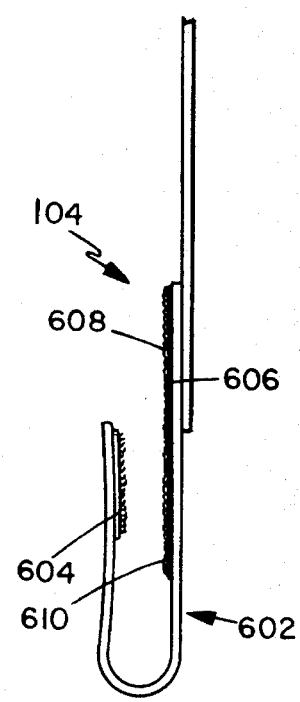
FIG. 6 illustrates a further type of restraining strap end, using a hook and loop fastener.

As another alternative, as illustrated in FIG. 6, the fastener 104 may comprise a strap 602 having patches or strips of mating hook and loop type fastener material such as VELCRO®. In this embodiment, the strap 602 is wrapped around a member and a free end 604 of the strap 602 having a patch of hook-type fastener material or VELCRO® is attached to a complementary patch 606 of mating loop-type fastener material. on the fastener 104. If the patch on the complementary end 606 is longer than the patch on the free end 604, the strap 602 is adjustable. That is, to tighten the restraining apparatus 100, the free end 604 is attached to the complementary end 606 toward the top 608 of the patch, whereas to loosen the restraining apparatus 100, the free end 604 is attached to the complementary end 606 toward the bottom 610 of the patch.

As yet another alternative, the fastener 104 may comprise a clamping mechanism, for example, a spring loaded clamp that can be squeezed to open and released to close. In this way, the clamp can be opened and placed over a member, and then released to attach the clamp to the member. To detach, the clamp is squeezed again to open, permitting it to be removed from the member. Such clamps are commonly available in commercial outlets and are thus well-known in the art.

The sheath 108 encloses the strap 102 and performs several useful functions. First, the sheath 108 provides protection against undue abrasion to the strap 102. Second, because the sheath 108 can be made from a soft, supple material, such as cotton, it also protects the baby in the child seat from abrasions. Third, the sheath 108 can have a decorative pattern on it, making the securing apparatus 100 attractive and particularly well-suited to use with babies. Fourth, the sheath 108 may be removable from the securing apparatus 100, making it washable, durable, and replaceable.

The sheath 108 may be attached to the strap 102 in various ways. The sheath 108 may be tied-off with a ribbon at each end 110, 112 of the strap 102, making the sheath 108 easily removable and adding an additional decorative touch. A VELCRO® strap of hook and loop type fastener material such as VELCRO® may be used to secure the sheath 108 at each end 110, 112, or a snap may perform the same function. Alternatively, the sheath 108 may have an elasticized cuff on each end that secures the sheath 108 to the ends 110, 112 of the strap 102. Finally, the sheath 108 may be sewn on to the ends 110, 112 of the strap 102. Those skilled in the art will recognize that other means can be employed to secure the sheath 108 to the ends 110, 112 of the strap 102.

Figure 2:
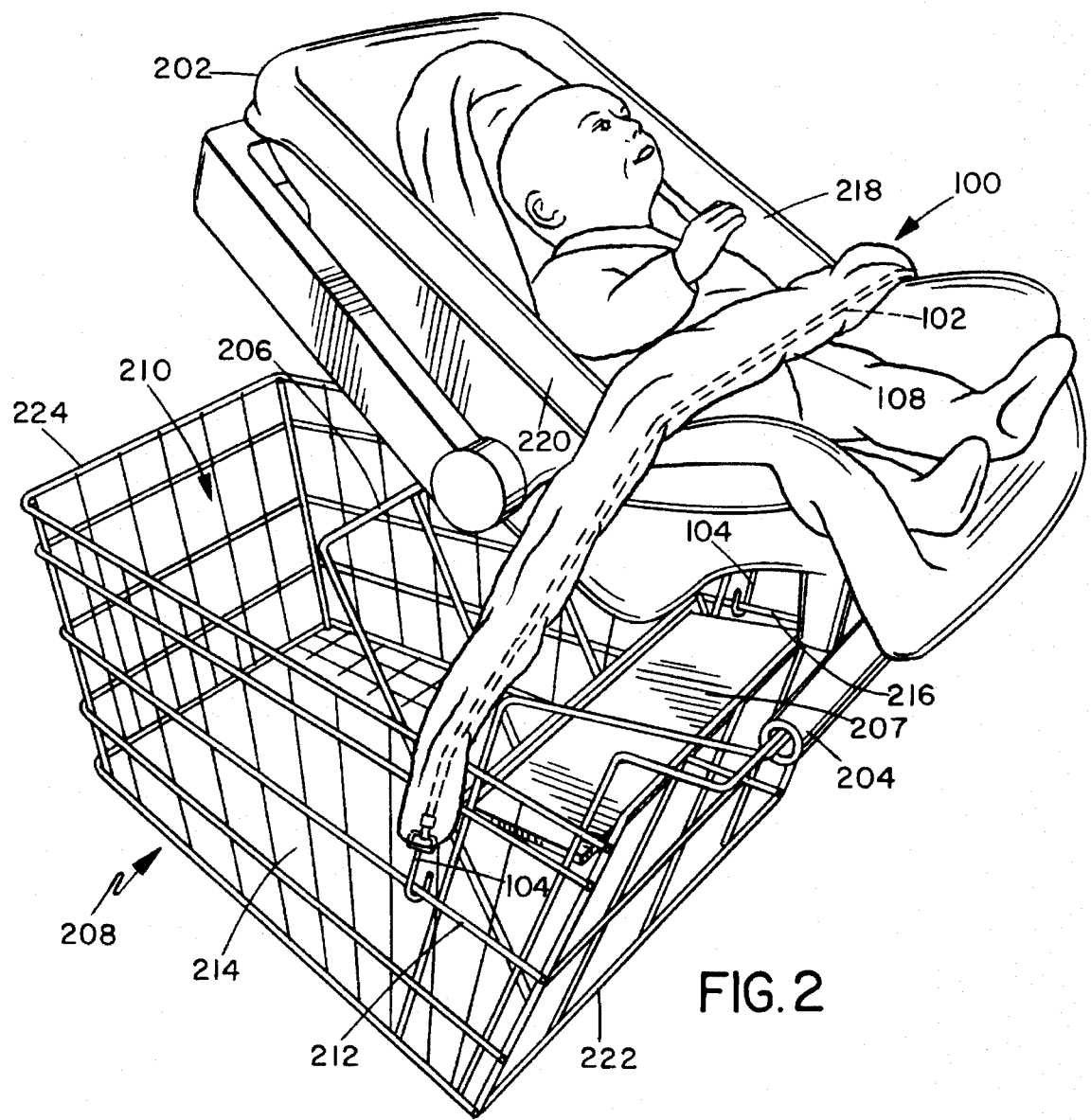
FIG. 2 illustrates a preferred embodiment of the restraining strap.

Referring now to FIG. 2, an application of the securing apparatus 100 of the present invention will be described. As illustrated, a child safety seat 202 can be placed across the handles 204 and the border 206 of the small basket 207 of a shopping cart 208. In this position, without the present invention, the child seat 202 is not adequately secured to the shopping cart 208. If the shopping cart 208 is accidently bumped or tilted, or if a child standing in the main basket 210 of the shopping cart 208 dislodges the child seat 202, the child seat 202, together with the baby, may fall to the ground, with disastrous consequences.

In accordance with the present invention, the securing apparatus 100 is attached to the shopping cart 208, crossing over the child seat 202 (as shown), and thereby securing the seat 202 to the cart 208. As illustrated, the fastener 104 is attached to one of the members 212 on a first side 214 of the shopping cart 208. The strap 102 is then placed across the child seat 202 and the other attaching means 106 is attached to another member 216 on the opposing side of the cart 208. As noted above, preferably each fastener 104 comprises a hook (as shown), which facilitates attachment of the securing apparatus 100 to the shopping cart 208. The hooks can be quickly and easily attached to the members 212, 216, and, if desired, the hooks can have a locking mechanism (as shown in FIG. 5), permitting them to be locked in place on the members 212, 216.

Preferably the strap 102 has elasticity and thus can be stretched over the child seat 202. The elastic strap 102 can be stretched as much as desired to obtain little or significant tension. The greater the tension, the greater the holding power of the securing apparatus 100. Furthermore, the child seat 202 may have slots (not shown) on its rails 218, 220 into which the strap 102 can be slotted. This provides further security, in that the strap 102 will not slide over the child seat 202 (either toward the baby's feet or head) and become accidently dislodged.

The strap 102 need not be elastic, however. The non-elastic version works better with the VELCRO® attaching means described above with reference to FIG. 6. In this version, the strap 102 can be placed over the child seat 202, and the VELCRO® fastener can be adjusted to obtain the desired tension on the strap 102, as described above.

Figure 3:
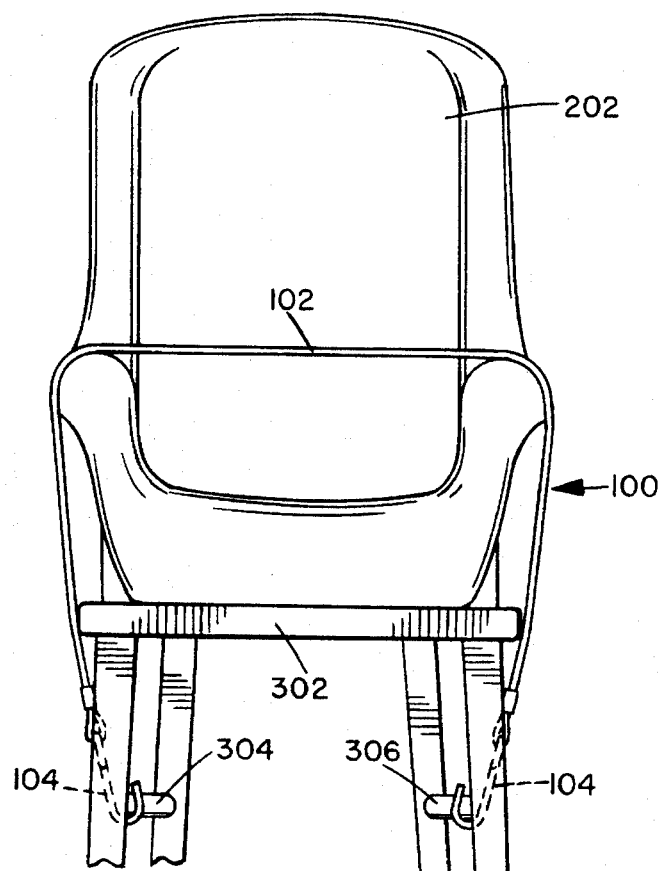
FIG. 3 is a front view of a child seat secured to a household chair by the restraining strap of the present invention.

Referring now to FIG. 3, the securing apparatus 100 of the present invention can be used to secure the child seat 202 to a household chair 302. The child seat 202 is first placed on the chair 302. The strap 102 of the securing apparatus 100 is then placed over the child seat, and the fasteners 104 are attached to members 304, 306 on opposing sides of the chair 302. If the strap 102 is elasticized, it can be stretched over the child seat 302, thereby securing it to the chair 302. As described above, however, the strap 102 need not be elastic, even in this application.

Figure 4:
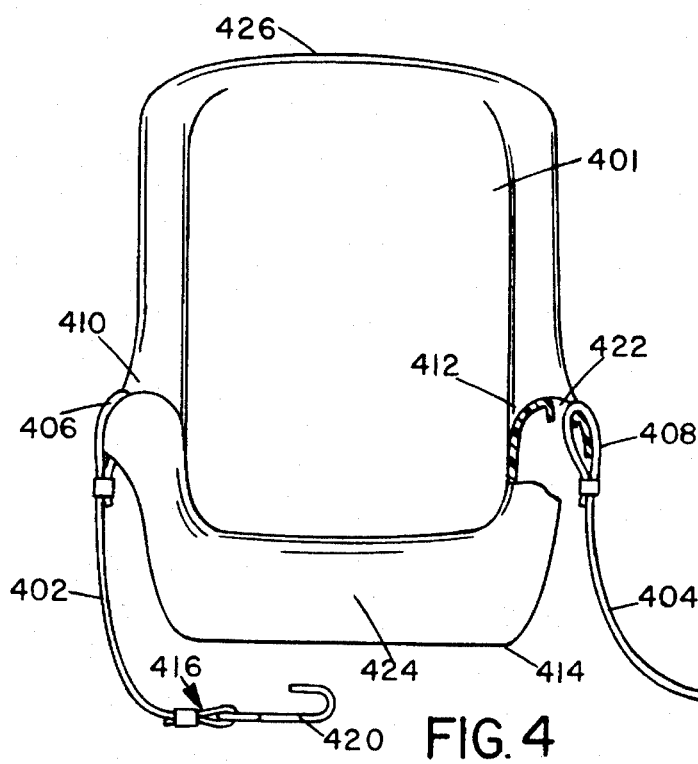
FIG. 4 is a front view of a child seat, partially cut away, showing individual straps attached to the arms of the seat.

In a second embodiment of the present invention, a child seat securing system is provided and is illustrated in FIG. 4. In this second embodiment, the system comprises a child seat 401, a first strap 402, and a second strap 404. Both the first strap 402 and the second strap 404 have one end 406, 408, respectively, attached to attaching areas 410, 412, respectively, of the child seat 401. As illustrated, the attaching areas 410, 412 are on opposing sides of the child seat 401. Nevertheless, the attaching areas 410, 412 can be located on different portions of the child seat 402, such as the bottom 414. On the other ends 416, 418, respectively, of the first and second straps 402, 404 are fasteners 420. The fasteners 420 are like the fasteners 104 of the first embodiment, comprising hooks or clamps or velcro straps.

The attaching areas 410, 412 may comprise an opening 422 in the side rails of the child seat 401. The ends 406, 408 of the first and second straps 402, 404 are threaded through the opening 422 and secured such that the straps 402, 404 will not pull free from the child seat 401. Those skilled in the art will recognize that many means exist by which to affix the ends 406, 408 within the openings 422 in the child seat 401.

As with the first embodiment, the second embodiment can be used on a shopping cart 208. It is to be understood, however, that use of the present invention on a shopping cart 208 is merely exemplary and that the present invention can be used on myriad other objects, such as household chairs 302, to secure the child seat. Referring back to FIG. 2, the child seat 401 of the second embodiment can be similarly placed across the handle 204 and internal border 206 of the shopping cart 208. The straps 402, 404 of the second embodiment would then be attached to opposing sides of the shopping cart 208 by the fasteners 420, thereby securing the child seat 401 in the cart 208. Of course, those skilled in the art will recognize that, if the straps 402, 404 are attached to an area of the child seat 401 other than as illustrated in FIG. 4, it may be easier and more secure to attach the straps 402, 404 to other portions of the cart 208. For example, if the straps 402, 404 were on the back 426 and front 424 of the child seat 401, the straps 402, 404 could attach to the back 222 and front 224 of the shopping cart 208.

The first and second straps 402, 404 may be removably attached to the child seat 401, so that the child seat 401 can be more easily carried. The straps 402, 404, if removable, can be placed in a compartment (not shown) in the child seat 401 when they are not being used. Removability of the straps 402, 404 can be accomplished via VELCRO® straps, a locking hook mechanism, or the like on the ends 406, 408 of the straps 402, 404. Preferably, the straps 402, 404 are elastic and can thus be stretched and attached to the cart 208 or household chair 302. As embodied herein, it is preferred to use hooks in combination with elastic straps.

In a third embodiment of the present invention, a child seat securing system is provided that comprises the shopping cart 208 and at least one strap attached to the shopping cart 208 via a fastener. The fastener is similar to the previously described fasteners 104, 420 and thus may comprise a hook, either locking or non-locking, a clamp, or a VELCRO® strap. Alternatively, the fastener may permanently affix the strap to the shopping cart 208.

In this third embodiment, the child seat 202 is placed in the shopping cart 208 and is secured via the strap attached to the cart. The end of the strap that is not attached to the shopping cart 208 may have a hook or like coupler. The coupler is used to affix the strap to the child seat 208, which may be supplied with a device into which the coupler can be mated. The coupler may comprise a large hook that does not require a mating device, such that the large hook can simply be hooked over the side rails 218, 220 of the child seat 202. Alternatively, this third system may further comprise one or more additional straps attached to the shopping cart 208 that can be affixed to the child seat 202. Additional straps will increase the security of the child seat 202 within the shopping cart 208, because the additional straps can be secured to opposing sides of the child seat 202. As with the previous two embodiments, preferably the straps are elastic.

The present invention provides many significant benefits. First, it prevents a child in the main basket 210 of the shopping cart 208 from pulling down or pushing out the child seat 202. Second, it prevents the child seat 202 from being dislodged from the shopping cart 208, household chair 302, or the like, due to jostling or collisions. Third, the invention is inexpensive, easy to manufacture, and extraordinarily easy to use. Fourth, the invention is easy to store, lightweight, and easy to carry, making it a perfect tool for a parent that must transport children, child seats, and the like. Other advantages will become apparent as the invention is used by parents everywhere.

It will be apparent to those skilled in the art that various modifications and variations can be made in the apparatus and method of the present invention without departing form the spirit or scope of the invention. Thus, it is intended that the present invention cover the modifications and variations of this invention, provided they come within the scope of the appended claims and their equivalents.

What is claimed is:

1. In combination, a shopping cart and child securing system, the shopping cart having a main basket having a forward end, opposite sides, a rear end, a handle at the rear end for pushing the cart, and a seating compartment for a child at the rear end of the cart, the seating compartment defining a seating area for a child having an upwardly facing, open end;

the child securing system comprising a child seat having a bottom portion, a back portion extending at an angle to said bottom portion for supporting a child's back, and opposite sides, the child seat being placed over the upwardly facing, open end of the shopping cart seating compartment; and a strap extending transversely across the child seat and the seating compartment, the strap having opposite first and second ends;

a first fastener at the first end of the strap attached to one side of the shopping cart adjacent the seating compartment; and a second fastener at the second end of the strap attached to the opposite side of the shopping cart.

2. The combination system as claimed in claim 1, wherein the strap has elasticity.

3. The combination system as claimed in claim 1, further comprising an elongate cover sheath enclosing the strap and extending along the length of the strap from the first end to the second end.

4. The combination system as claimed in claim 1, wherein the first fastener and the second fastener each comprise a hook, the shopping cart has a plurality of openings, and each hook is hooked through an opening on a respective side of the cart to secure the child seat over the seating compartment.

5. The combination system as claimed in claim 4, wherein each hook has a locking mechanism for releasably locking the hook in the respective opening.

6. In combination, a shopping cart and a child securing system, the shopping cart having a main basket having a forward end, opposite sides, a rear end, a handle at the rear end for pushing the cart, and a seating compartment for a child at the rear end of the cart, the seating compartment defining a seating area for a child having an upwardly facing, open end;

a child seat having a bottom portion, a back portion for supporting a child's back, and opposite sides, the child seat being placed over the upwardly facing, open end of the shopping cart seating compartment;

a first strap having a first end secured to one side of the child seat and a second end;

a first fastener at the second end of the first strap secured to one side of the shopping cart;

a second strap having a first end secured to the opposite side of the child seat and a second end; and a second fastener at the second end of the second strap secured to the opposite side of the shopping cart;

whereby the child seat is secured to the shopping cart in a location over the shopping cart seating compartment.

7. The combination system as claimed in claim 6, wherein the first and second straps are elasticated.

8. The combination system as claimed in claim 6, wherein the sides of the shopping cart include spaced, parallel bars and each fastener comprises a flexible fastener strip having a first end secured to the respective strap end and a second end, the first end of the fastener strip having a first patch of hook and loop fastener material and the second end of the fastener strip having a second patch of mating hook and loop fastener material for releasable securing engagement with said first patch, each fastener strip being extended around a bar on the respective side of the shopping cart with the first patch in mating engagement with the second patch to secure the respective end of the strap to the cart.

9. The combination system as claimed in claim 6, wherein the sides of the shopping cart include spaced, parallel bars, and the first and second fasteners comprise a first and second hook, respectively, the first hook being hooked over a bar on said one side of the shopping cart and the second hook being hooked over a bar on said opposite side of the shopping cart.

10. The combination system as claimed in claim 9, wherein each hook includes a locking mechanism for releasably locking said hook over the respective bar.

11. A method of securing a child seat to a shopping cart, comprising the steps of:

placing a child seat over a deployed child seating compartment of a shopping cart so as to straddle and be seated on top of spaced front and back walls of the seating compartment;

attaching a first end of a strap to one side of the shopping cart at a location on one side of the seating compartment;

extending the strap over the top of the child seat and over the seating compartment to the opposite side of the shopping cart; and attaching a second end of the strap to the opposite side of the shopping cart at a location on the opposite side of the seating compartment to the first end of the strap.

12. The method as claimed in claim 11, wherein the strap is resiliently extended over the child seat and seating compartment and maintained in its extended condition when the second end is secured to the opposite side of the shopping cart.

13. The method as claimed in claim 11, wherein the step of attaching the first end of the strap comprises hooking a hook at the first end of the strap over a bar on the one side of the shopping cart, and the step of attaching the second end of the strap comprises hooking a hook at the second end of the strap over a bar on the opposite side of the shopping cart.

14. A child securing system for securing child to a shopping cart, comprising:

a child seat having a bottom portion, a back portion extending at an angle to said bottom portion for supporting a child's back, and opposite sides;

a first strap having a first end secured to an opening in one side of the child seat and a second end;

a first fastener at the second end of the first strap;

a second strap having a first end secured to an opening in the opposite side of the child seat and a second end;

a second fastener at the second end of the second strap; and the first and second fasteners comprising means for attachment to opposite sides of a shopping cart basket adjacent a deployed child seating compartment in the shopping cart with the child seat positioned over the seating compartment, said straps comprising means for securing the child seat in position over the seating compartment.

* * * * *